(12) United States Patent
Juris

(10) Patent No.: US 8,662,147 B2
(45) Date of Patent: Mar. 4, 2014

(54) GEOTHERMAL AIR-CONDITIONER DEVICE

(75) Inventor: Heiki Juris, Tartu (EE)

(73) Assignee: Airmaker GTR Ltd, Tartu (EE)

( * ) Notice: Subject to any disclaimer, the term of this patent is extended or adjusted under 35 U.S.C. 154(b) by 992 days.

(21) Appl. No.: 12/668,423

(22) PCT Filed: Jul. 10, 2007

(86) PCT No.: PCT/EE2007/000012
§ 371 (c)(1),
(2), (4) Date: Jan. 10, 2010

(87) PCT Pub. No.: WO2009/006908
PCT Pub. Date: Jan. 15, 2009

(65) Prior Publication Data
US 2010/0181044 A1    Jul. 22, 2010

(51) Int. Cl.
*F24J 3/08*    (2006.01)

(52) U.S. Cl.
USPC ........................................ 165/45; 165/104.34

(58) Field of Classification Search
USPC ................ 165/45, 104.34; 454/238, 255, 340
See application file for complete search history.

(56) References Cited

U.S. PATENT DOCUMENTS

| | | | |
|---|---|---|---|
| 462,179 A * | 10/1891 | Turley et al. ................. | 165/45 |
| 654,264 A | 7/1900 | Lueder | |
| 4,234,037 A | 11/1980 | Rogers et al. | |
| 4,459,177 A * | 7/1984 | O'Hare ........................... | 165/45 |
| 4,674,561 A | 6/1987 | Kelley | |
| 5,131,887 A | 7/1992 | Traudt | |

FOREIGN PATENT DOCUMENTS

| | | |
|---|---|---|
| DE | 3414973 A | 10/1985 |
| EE | 00329 U1 | 10/2002 |
| EE | 200200212 A | 6/2003 |
| FI | 20040429 A | 9/2005 |
| JP | 2005009737 A | 1/2005 |
| JP | 2005090929 A | 4/2005 |

* cited by examiner

Primary Examiner — Teresa Walberg
(74) Attorney, Agent, or Firm — Soroker—Agmon

(57) ABSTRACT

The present invention is directed to provide a geothermal air-conditioner device utilising the earth's temperature and electrical field for processing—preheating, cooling and purifying—room intake air. This air-conditioner device includes at least one first pressure reducing chamber (1) with air intake opening (8) and second pressure reducing chamber (2) with processed air outlet (9), whereas these chambers are connected to each other by air conduits (3) located in the ground for conveying air from the first pressure reducing chamber (1) to the second pressure reducing chamber (2). The earth layer (4) on the air channels (3) is covered by a coarse material layer (5), under which at least one first ventilation conduit (6) is extending, through which coarse material layer is connected to air in chamber (1). Likewise there is exhaust ventilation piping (7) to provide exhaust from the coarse material layer (5) located.

11 Claims, 4 Drawing Sheets

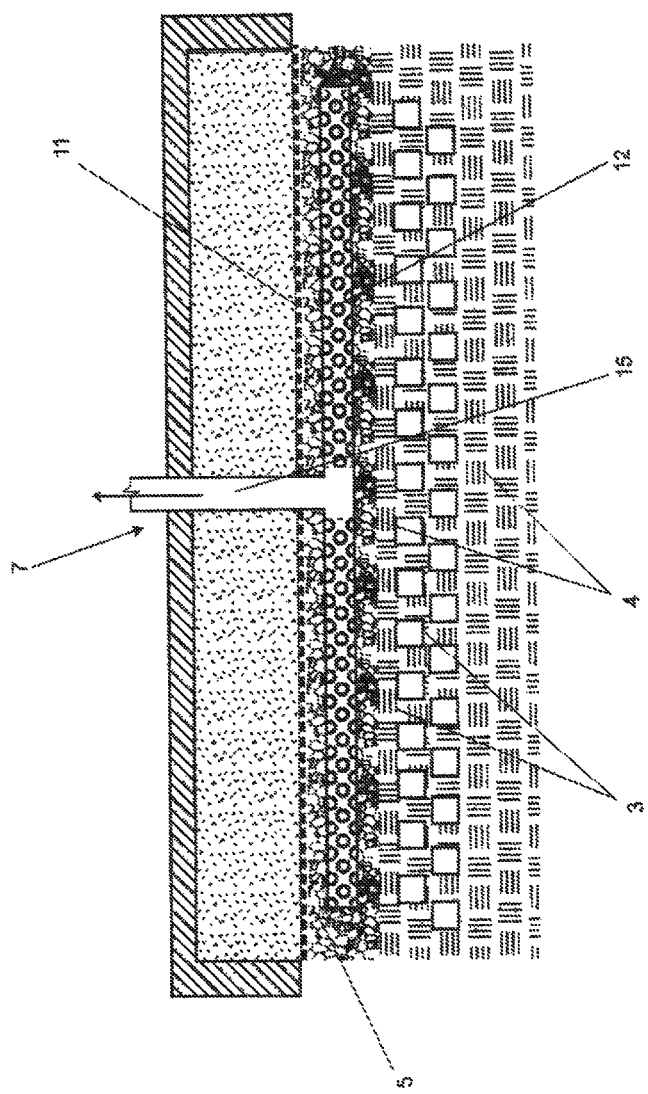

GEOTHERMAL AIR-CONDITIONER DEVICE

TECHNICAL FIELD

The objective of this invention is to provide a device utilising the earth's temperature and electrical field, and acting primarily as an air-conditioner for processing—preheating, cooling and purifying—room intake air.

BACKGROUND ART

There is known intake air preheating, cooling and purifying equipment, named accordingly as calorifiers, conditioners, filters, ionisers and ozonators.

From the prior art are known several different technical solutions for conducting outside air into a building's ventilation system through the ground. For example U.S. Pat. No. 5,131,887 discloses an air handling system built into a building's basement, German patent DE-3414973 discloses a system with an air chamber located in the ground, connected with an air intake conduit on top of it, and connected to an air intake conduit of the building.

Document JP2005090929 discloses a ventilating system which performs air supply with ground heat. In the ventilating system air supply to each living room is carried out in such a manner that geothermal air is taken out to a stairwell, stairs, etc., through a pipe installed in a building. The ventilation is carried out with a ventilation fan being attached thereto in a conventional manner. The supply of the ground heat reduces the difference in temperature at the time of ventilation, leading to the reduction in air-conditioning cost.

Document JP2005009737 discloses a system cooling and heating by directly guiding soil heat transferred through a pipe buried under the ground into a room, and efficiently carrying out air conditioning of the room with little energy by using a heating means having an ON/OFF mechanism and using the heat of the heating means in addition to the soil heat during winter. The described system comprises the underground pipe buried in the ground beneath a house, air is sent into the underground pipe by a blower, heat exchange with the heat of soil is carried out in the underground pipe, and the room is air-conditioned by sending air into the room via an air flow passage.

The solution is disclosed by Estonian Utility Model EE-00329-U1, which is geothermal heat exchanger equipment for preheating and cooling of fresh air conducted to living rooms. From the grilled intake opening on the building's façade, fresh intake air is directed into a pressure decreasing chamber located in the ground or under the building's basement floor. From the pressure decreasing chamber, air is conveyed through a conduit into the second pressure decreasing chamber. The outlet of the second pressure decreasing chamber is connected to the building's ventilation system.

More similar to this invention is the design of geothermal heat exchanger equipment disclosed by the inventor of this invention in Estonian patent application P200200212 and Finnish patent application F120040429, which is also a prototype of this invention.

DISCLOSURE OF INVENTION

Intake air for rooms is mostly processed in machinery, characterised by high operation costs making intake air dry and degrading other parameters of room climate.

The objective of this invention is further development of the earlier design of equipment developed by the same inventor, making it simpler and more efficient. Furthermore, the objective of the invention is to utilise the negative charge of the ground for alternation of the intake air electrostatic condition, giving substantial improvement to the intake air micro climate. The further objective of the invention is to provide a geothermal air-conditioner device which is simpler, cheaper and smaller by construction than earlier devices. The objective of this equipment is also to provide a device in which heating (during the cold season) or cooling (during the warm season) of the air flowing in the air conducts, by delivering heat (heating) or removal of heat (cooling) accordingly, is spontaneously controlled by the device.

An additional objective of this invention is passing radon found in the earth out of the building, to provide protection for humans in the rooms from the harmful effect of radon.

This invention deals with equipment for continuous processing of room intake air during continuous flow of air through this equipment.

The subject of the invention is an air-conditioner device consisting of first a pressure reducing chamber with intake for process air, and second a pressure reducing chamber with an outlet for process air, connected by air conduits for conveying air from the first pressure reducing chamber into the second pressure reducing chamber, positioned in parallel with each other in one of several layers, whereas these air conduits are not straight but are bent at an angle and could be pipes with different that circular cross section. There is an aired coarse material layer on the hearth layer covering the air conduits, covered by a coating layer, i.e. plastic sheet. For airing, there is at least one ventilation opening directed into the coarse material layer under the coating layer, providing a connection from coarse material to atmosphere air, and for providing draft from coarse material, there are draft ventilation conduits built into the coarse material in the area between pressure reducing chambers.

This ensures evacuation of exchanged energy from the system, i.e. this energy will not accumulate into ground around air conduits.

BRIEF DESCRIPTION OF DRAWINGS

The embodiments according to present invention will be described below with references to drawings, where

FIG. 4 shows the location of the conduits of the geothermal air-conditioner device in the ground with a quadrangular cross section, according to the invention.

MODE(S) FOR CARRYING OUT THE INVENTION

Figure 1:
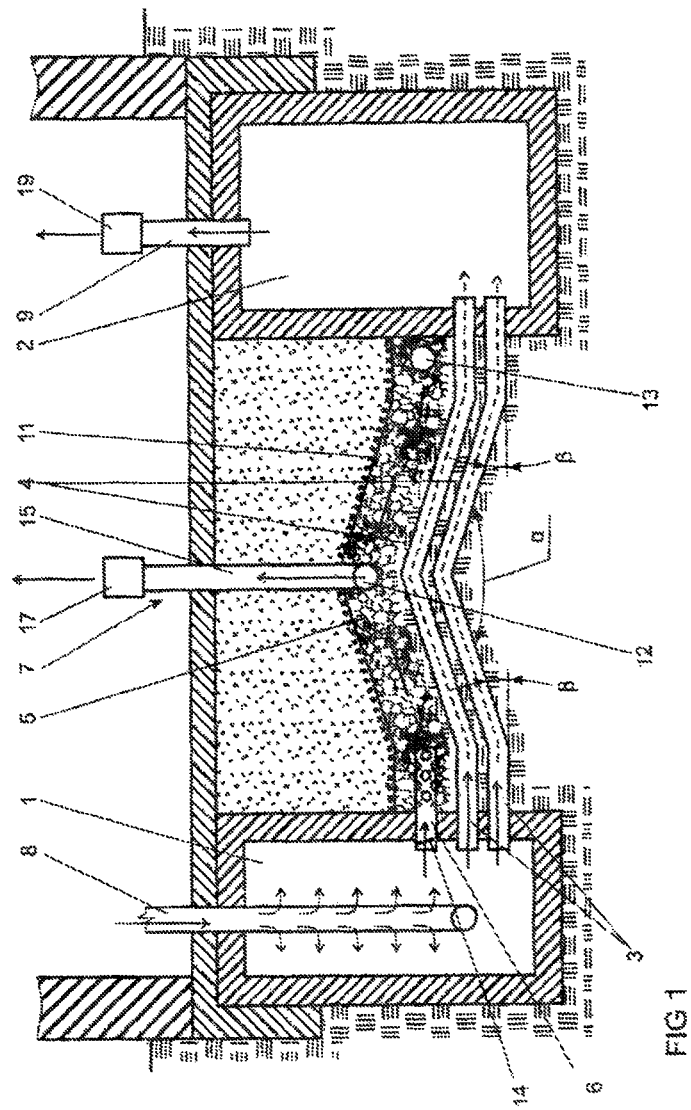
FIG. 1 shows the vertical section of the geothermal air-conditioner device arranged under the building.

Geothermal air-conditioner device shown on FIG. 1 comprises the pressure reducing chambers 1 and 2 known from earlier solutions, and air conduits 3 in between them.

Pressure reducing chambers 1 and 2 are provided in the ground, at a depth where the floors of the chambers are slightly lower than the ends of the entering air conduits 3. Process air enters the first pressure reducing chamber through process air intake conduit 8, which is fully imbedded in pressure reducing chamber 1. In comparison with earlier solutions, this kind of intake conduit design will avoid air backflow from the channel. Therefore, natural outside air will flow to the first pressure reducing chamber 1, and will continue to air conduits 3 embed into the ground and to conduits 6 entering to coarse material.

Figure 2:
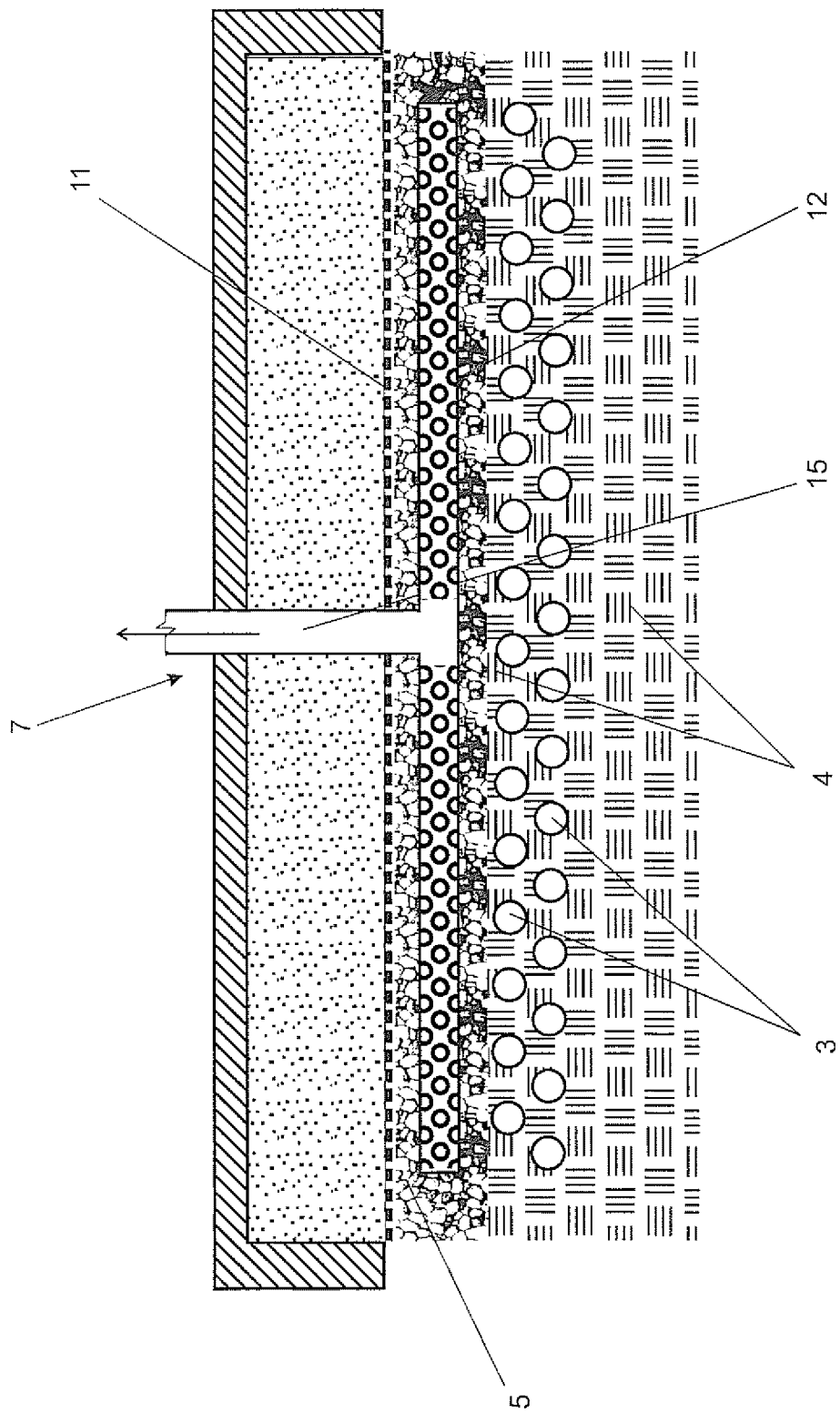
FIG. 2 shows the location of the conduits of the geothermal air-conditioner device in the ground with a circular cross section, according to the invention.
Figure 3:
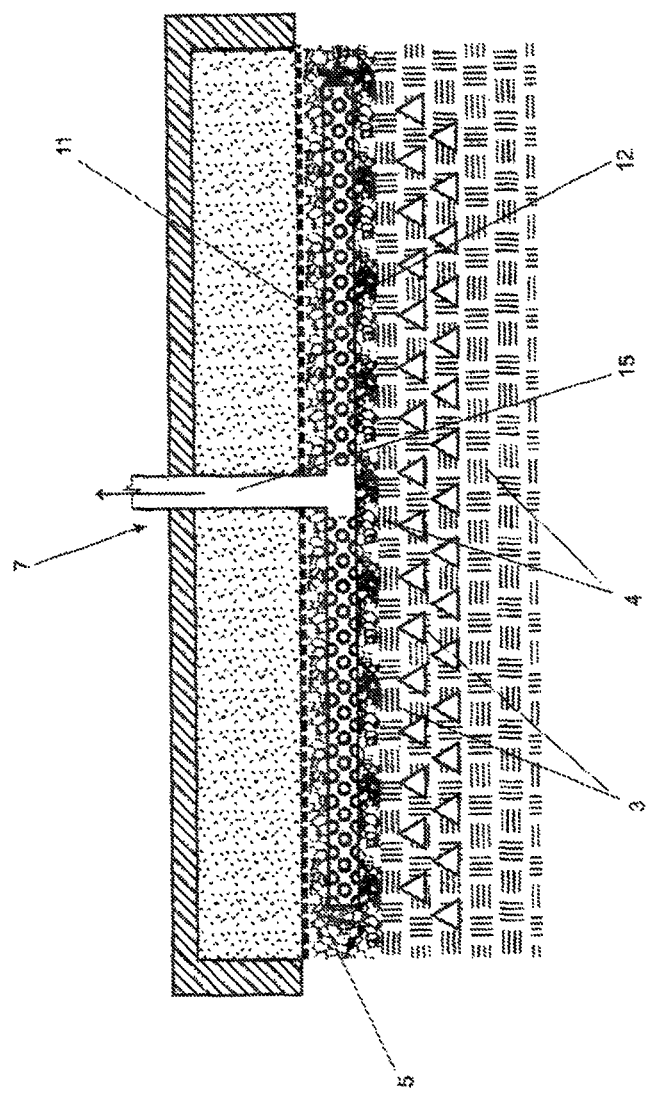
FIG. 3 shows the location of the conduits of the geothermal air-conditioner device in the ground with a triangular cross section, according the invention.

Air conduits 3 are bent from centre (approximately 110-170 degrees) in an angle and cross section of conduits could be for example triangular, round or quadrangle. Air conduits could be bent on several layers (see FIG. 2) over or in between each other as a chess table to save space. According to the figure, bending is located halfway between the pressure reducing chambers so that in the beginning, intake air flows in the air conduits upwards by about 10-17 degrees horizontal and reaching the bending point located approximately in the centre, air starts to flow downwards regarding horizontal. Operation of the device requires embedding air conduits 3 into the ground at a depth where ground positive temperature is effective around the year, e.g. in winter and summer.

Lengths of air conduits 3 is chosen to ensure necessary air exchange reaction between air and air conduits 3 walls (ground) according to air flow speed in air conduits 3 embedded in the ground. In air conduits 3, heat exchange reaction between air and ground occurs. The air conduit diameter and quantity is dimensioned according to the required air amount, to provide air flow speed (0.3 to 2.0 m/s) in air conduits 3.

Air flows from air conduits 3 into the pressure reducing chamber 2, connected to a fan or fully automatic ventilation equipment with heat recovery, which draws necessary fresh air from the second pressure reducing chamber 2 through the processed air outlet 9 and directs it to the mentioned ventilation system or air inflow conduits.

Earth layer 4 surrounding air conduits 3 is covered by a layer of aired material, particularly coarse material layer 5, made from, i.e. gravel, light gravel, rubble, granules, etc. This is provided with ventilation conduits 6 located in the area close to pressure reducing chambers and ensuring outside air access to the coarse material layer. These conduits 6 are provided with check valves located on side of the first pressure reducing chamber 1, avoiding air flow from the first aired material layer to the first pressure reducing chamber 1.

There is an exhaust opening or exhaust ventilation piping 7 is installed from the coarse material layer 5 in area of air conduit 3 bending centre. In winter season, outside air is warmed in parallel air conduits 3, e.g. warmth is delivered from ground 4 to the air flowing through conduits. Ventilation piping 7 comprises air channel 15 connected to outside air, through which air from coarse material layer is directed out of the system, and horizontal air channel 12 located above air channels 3 in parallel with them, whereas this horizontal air channel is fully perforated to ensure air access to ventilation piping along whole length of air conduit 3 layer. Air channel 15, connecting ventilation piping 7 to atmosphere air can be provided additionally with a fan (17) or another ventilation device to ensure equilibrium of air flows in the system.

The coarse material layer 5 is covered by coating layer 11, e.g. plastic sheet of another thin material. There is ventilation conduit 13 installed in pressure reducing chamber 2 end coarse material layer 5, conveying room air into the coarse material layer 5. This conduit is provided with a control valve. To improve air flow into coarse material layer 5, section of ventilation conduit 13 located in the coarse material layer is profiled and ventilation conduit 13 extends through the coarse material layer in whole width of air conduits 3, being substantially crosswise with them.

This ensures evacuation of exchanged energy from the system, i.e. this energy will not accumulate into the ground around air conduits 3.

A well known fact is that heat transfer (energy transmission) takes place from a higher temperature environment into lower temperature environment, whereas air mass (volume, amount) with a higher volume will force back/leave the air mass with a smaller volume, whose intensity is proportional to the temperature difference of sides. In the winter season, outside air is warmed in parallel air conduits 3, e.g. warmth is delivered from the ground to the air flowing through conduits 3.

In the summer season the reverse process is effective, e.g. fresh warm outside air will be cooled to a suitable temperature.

Permanent upward direction of ground temperature and electricity field is ensured by aired coarse material layer 5 laid on top of ground (soil) layer 4, covering air conduits 3, and therefore energy accumulation to the ground layer around the air conduits is avoided.

In preferred implementation, the device is located in the ground. Airflow is directed through intake conduit 8 to first pressure reducing chamber 1, then to air conduits 3, where the heat transfer reaction with ground 4 takes place, and then to second pressure reducing chamber 2, from which processed air departs through outlet 9.

Pressure reducing chambers 1 and 2 could be realised as part of the building's foundation or could be located as separated structures inside of the building's foundation (e.g. in case of pile foundation.)

In the device according to invention, air is conveyed by fans through intake conduit 8 to the first pressure reducing chamber 1, then the air is directed to air conduits 3 located in the ground, where heat transfer reaction takes place, from air conduits 3, air is directed to the second pressure reducing chamber 2. From the second pressure reducing chamber 2, processed air flows out from outlet 9, connected to a fan (19) or fully automatic ventilation equipment with heat recovery, which draws required fresh air from the second pressure reducing chamber 2, and directs it to the ventilation system or air inflow conduits mentioned above. Optionally, working cycles of the fan or other ventilation device 17 of air conduit 15 connecting the exhaust ventilation piping 7 with atmosphere air, and the fan or other ventilation device 19 connected to outlet 9 of the second pressure reducing chamber (2) are synchronized with each other.

Air conduits 3 are covered by ground layer 4 and the ground (soil) 4 layer, covering the air conduits, is covered by aired coarse material (gravel, light gravel, rubble, granules, etc.) layer 5. The coarse material layer is covered by coating layer 11. In the coarse material layer, ventilation conduit 6 is located close to first pressure reducing chamber 1 and another ventilation conduit 13 is located next to the second pressure reducing chamber, whereas through these ventilation conduits, atmosphere air is also conveyed to the coarse material layer to provide atmosphere air access to the coarse material layer laying inclined on the air conduits from the second pressure reducing chamber.

During continuous warming of air around air conduits 3 ground 4 is cooled down and therefore compensating heat energy should be ensured to the air conduit 3 area. Coarse material layer 5 covering air conduits 3 is also connected to atmosphere air through ventilation openings 6 and 13, as a result of which, air from first ventilation conduit 6 and second ventilation conduit 13 to the second is drawn through ventilation piping 7 and the coarse material layer. As a result of this, the temperature of this coarse material layer 5 is (in winter) lower than the temperature of the lower ground (soil) layer containing conduits for warming air. Therefore heat transfer directed upwards in the ground is more intensive because of larger temperature differences.

This ensures evacuation of exchanged energy from the system, i.e. this energy will not accumulate into ground around air conduits.

In summer period, reverse process is effective, e.g. warm atmosphere air is cooled down and excessive cooling of the air flowing through conduits is avoided.

Geothermal air-conditioner device according to this invention is not limited as implementation example described above or characteristics listed in patent claims, since this geothermal air-conditioner device could also be located outside the building's foundation. Likewise, according to the building's volume and foundation size, more than one geothermal air-conditioner device could be located under the building, whereas air intake openings of them could be connected to the common ventilation system.

The invention claimed is:

1. A geothermal air-conditioner device; comprising:
    a first pressure reducing chamber (1) with an air intake opening (8); a second pressure reducing chamber (2) with a processed air outlet (9); wherein the first and second pressure reducing chambers (1, 2) are connected to each other with air conduits (3) located in the ground for conveying air from the first pressure reducing chamber (1) to the second pressure reducing chamber (2);
    wherein a ground layer (4) covering air conduits (3) is covered with a coarse material layer (5), which is covered by a coating layer (11); at least one first ventilation conduit (6) extends into the coarse material layer (5) through the coating layer (11) for connecting the coarse material layer (5) to air in the first reducing chamber (1);
    an exhaust ventilation piping (7) located in the coarse material layer (5) for providing exhaust from coarse material layer (5);
    a fan or other ventilation device (19) is connected to an outlet (9) of the second pressure reducing chamber (2);
    wherein the air conduits (3) are bent by approximately 110-170 degrees of a bending angle α with a bending point facing upwards, so that at the beginning intake air will flow upwards by an angle β of approximately 10-17 degrees from the horizontal and after bend angle α in air conduits (3) the air will flow downwards relative to the horizontal to the second pressure reducing chamber (2); and
    a check valve (14) is provided at one end of the first ventilation conduit (6) close to the first pressure reducing chamber (1).

2. A geothermal air-conditioner device according to claim 1, wherein the exhaust ventilation piping (7) located in the coarse material layer (5) to provide exhaust, is located close to the bending in the centre of air conduits (3).

3. A geothermal air-conditioner device according to claim 2, wherein the exhaust ventilation piping (7) comprises an air channel (15) connected to atmosphere air, through which air from coarse material layer (5) is directed out of the system, and a horizontal air channel (12) located above air conduits (3) generally crosswise with them, whereas the horizontal air channel (12) is fully perforated.

4. A geothermal air-conditioner device according to claim 1, wherein air conduit (15) connecting ventilation piping (7) with atmosphere air is provided with a fan or other ventilation device (17).

5. A geothermal air-conditioner device according to claim 4 wherein working cycles of the fan or other ventilation device (17) of air conduit (15) connecting the exhaust ventilation piping (7) with atmosphere air, and the fan or other ventilation device (19) connected to outlet (9) of the second pressure reducing chamber (2) are synchronized with each other.

6. A geothermal air-conditioner device according to claim 1, wherein close to the second pressure reducing chamber side end of coarse material layer (5), a second ventilation conduit (13) is located, through which the air taken from the building is conveyed to coarse material layer (5), and wherein the ventilation conduit (13) located in the coarse material layer (5) is perforated.

7. A geothermal air-conditioner device according to claim 1, wherein the cross section of air conduits (3) is triangular, round or quadrangle.

8. A geothermal air-conditioner device according to claim 1, wherein the first ventilation channel (6), located in the coarse material layer, is fully perforated.

9. A geothermal air-conditioner device according to claim 1, wherein air conduits (3) are located in at least one layer side by side evenly distributed in the whole length of the the first and second pressure reducing chambers (1, 2).

10. A geothermal air-conditioner device according to claim 1, wherein air conduits (3) are located in several layers side by side and evenly distributed in the whole length of the first and second pressure reducing chambers (1, 2), wherein layers are shifted by each other in a checker board pattern.

11. A geothermal air-conditioner device according to claim 1, wherein air flow speed in air conduits (3) is 0.3 to 2.0 m/s.

* * * * *